United States Patent [19]
Hook et al.

[11] Patent Number: 5,678,842
[45] Date of Patent: Oct. 21, 1997

[54] COLLAPSIBLE CART

[75] Inventors: Reginald Wayne Hook, Langley; Derek John McRae, White Rock; Sean Martin Balkwill; Mel Gibb, both of Surrey, all of Canada

[73] Assignee: Go Industries Inc., Langley, Canada

[21] Appl. No.: 362,893

[22] Filed: Dec. 23, 1994

[51] Int. Cl.⁶ .............................. B62B 3/00; B62B 3/02
[52] U.S. Cl. ................. 280/646; 280/655; 280/47.24; 280/DIG. 3; 248/98
[58] Field of Search ................................ 280/646, 652, 280/42, 47.17, 47.24, 47.26, 47.315, 655, DIG. 4, 651, DIG. 3, DIG. 6; 248/97, 98

[56] References Cited

U.S. PATENT DOCUMENTS

| | | | |
|---|---|---|---|
| 2,775,464 | 12/1956 | Williamson | 280/38 |
| 2,835,501 | 5/1958 | Chamberlin et al. | 280/41 |
| 2,890,060 | 6/1959 | Ott et al. | 280/42 |
| 3,079,166 | 2/1963 | Abgarian | 280/40 |
| 4,830,385 | 5/1989 | Wallick | 280/35 |
| 4,946,186 | 8/1990 | Cheng | 280/646 |

*Primary Examiner*—Richard M. Camby
*Attorney, Agent, or Firm*—Oyen Wiggs Green & Mutala

[57] ABSTRACT

A collapsible cart for transporting a plurality of handled shopping bags and the like. The cart has an elongated frame having upper and lower sections which are pivotally coupled together. The frame is adjustable between a deployed position where the upper and lower frame sections are substantially aligned longitudinally and a collapsed position where the upper and lower frame sections are folded together. A pair of wheels are pivotally coupled to the lower section of the frame which fold together when the frame is collapsed. A support arm for suspending a load is pivotally coupled to the frame upper section and is moveable between a horizontal, load-supporting position and a folded position extending alongside the frame. The shopping bags are suspended from a plurality of hooks mounted on the support arm.

16 Claims, 4 Drawing Sheets

5,678,842

1

COLLAPSIBLE CART

FIELD OF THE INVENTION

This application relates to a collapsible cart for transporting a plurality of handled shopping bags and the like. The shopping bags are suspended from a folding support arm which extends laterally from the cart frame in a load-supporting position.

BACKGROUND OF THE INVENTION

One problem with conventional carts and buggies for transporting shopping items is that the load is supported from below. Most conventional carts incorporate a small basket or similar receptacle into which the shopping items are placed. However, stacking of shopping items one upon another may result in damage to the products or product packaging.

U.S. Pat. No. 4,830,385, which issued to Wallick et al. on 16 May, 1989, relates to a shopping cart having a laterally extending support bar for suspending a plurality of grocery bags. Suspending the bags from above in this manner expands the cart's carrying capacity and avoids the need to stack a plurality of bags on top of one another. The Wallick cart may be dismantled for storage or transport purposes, but it is not readily collapsible for optimum consumer convenience.

Various collapsible golf carts and mail bag carts are known in the prior art. However, such carts are not specifically designed for carrying a plurality of grocery bags and the like and often employ complicated linkage mechanisms which significantly increase manufacturing costs. The need has therefore arisen for a lightweight cart specifically designed for suspending a plurality of grocery bags which may be quickly and easily folded to a very compact size for transport or storage purposes.

SUMMARY OF THE INVENTION

In accordance with the invention a collapsible cart is disclosed comprising an elongated frame having a first section and second section pivotally coupled to the first section. The frame is adjustable between a deployed position wherein the second section extends above the first section for steering the cart, and a collapsed position wherein the first and second sections are folded alongside one another. At least one wheel is rotatably coupled to the first section. A support arm is pivotally coupled to one of the first and second sections and is adjustable between a load supporting system extending laterally from the frame and a folded position alongside the frame and extending parallel thereto. Retention means are provided on the support arm for retaining a load to be suspended.

Preferably the first and second frame sections are substantially longitudinally aligned in the deployed position. The cart may further include locking means on the frame for restraining pivotal motion of the first and second sections in the deployed position. The locking means may consist of a sleeve slidably coupled to the second section, the sleeve having a socket for snugly receiving an upper end of the first section in the deployed position.

Preferably the retention means consists of a plurality of spaced-apart hooks mounted on the support arm. The hooks may be formed on at least one continuous hook rod secured to a side surface of the support arm.

Preferably the support arm is pivotally coupled to the frame second section. A lower end of the frame first section may consist of a ground-engaging stand for supporting the cart in the deployed position.

A pair of wheels are advantageously provided for supporting the cart in the deployed position. A pair of support legs pivotally couple the wheels to the first section. Linkage means extend between each of the support legs and the second section for actuating pivoting movement of the support legs when the frame is moved between the collapsed and deployed positions. The wheels and the support arm are preferably disposed on opposite sides of the frame in the deployed position.

The upper end of the second section may consist of a steering handle. A carrying handle is preferably provided on the first section for carrying the cart in the collapsed position.

The support arm preferably extends horizontally in the load-supporting position. The longitudinal axis of the frame extends at an angle of approximately 30 degrees relative to a vertical axis in the deployed position. When the frame is in the deployed position, the cart is free-standing. The support arm counterbalances the weight of the second section in the load-supporting position.

BRIEF DESCRIPTION OF THE DRAWINGS

In drawings which illustrate a preferred embodiment of the invention, but which should not be construed as restricting the spirit or scope of the invention in any way.

DETAILED DESCRIPTION OF THE PREFERRED EMBODIMENT

Figure 1:
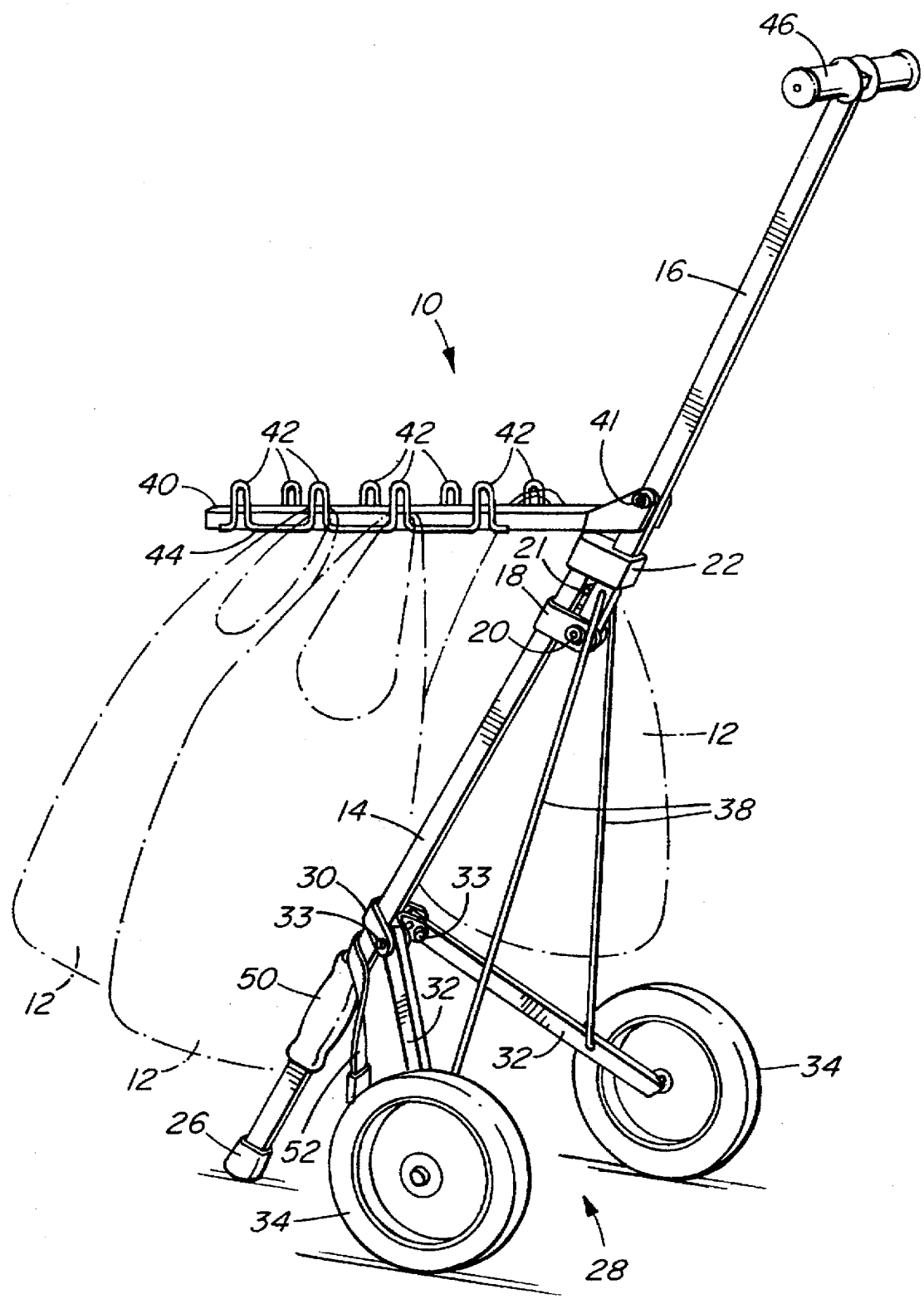
FIG. 1 is an isometric view of the applicant's collapsible cart in its fully deployed configuration for supporting a plurality of handled grocery bags shown in dotted outline.

With reference to FIG. 1, this application relates to a collapsible cart 10 for carrying a plurality of handled shopping bags 12. As described further below, cart 10 is readily collapsible from the fully deployed, loading-supporting configuration shown in FIGS. 1 and 2 to a compact, fully collapsed position shown in FIG. 3.

Figure 2:
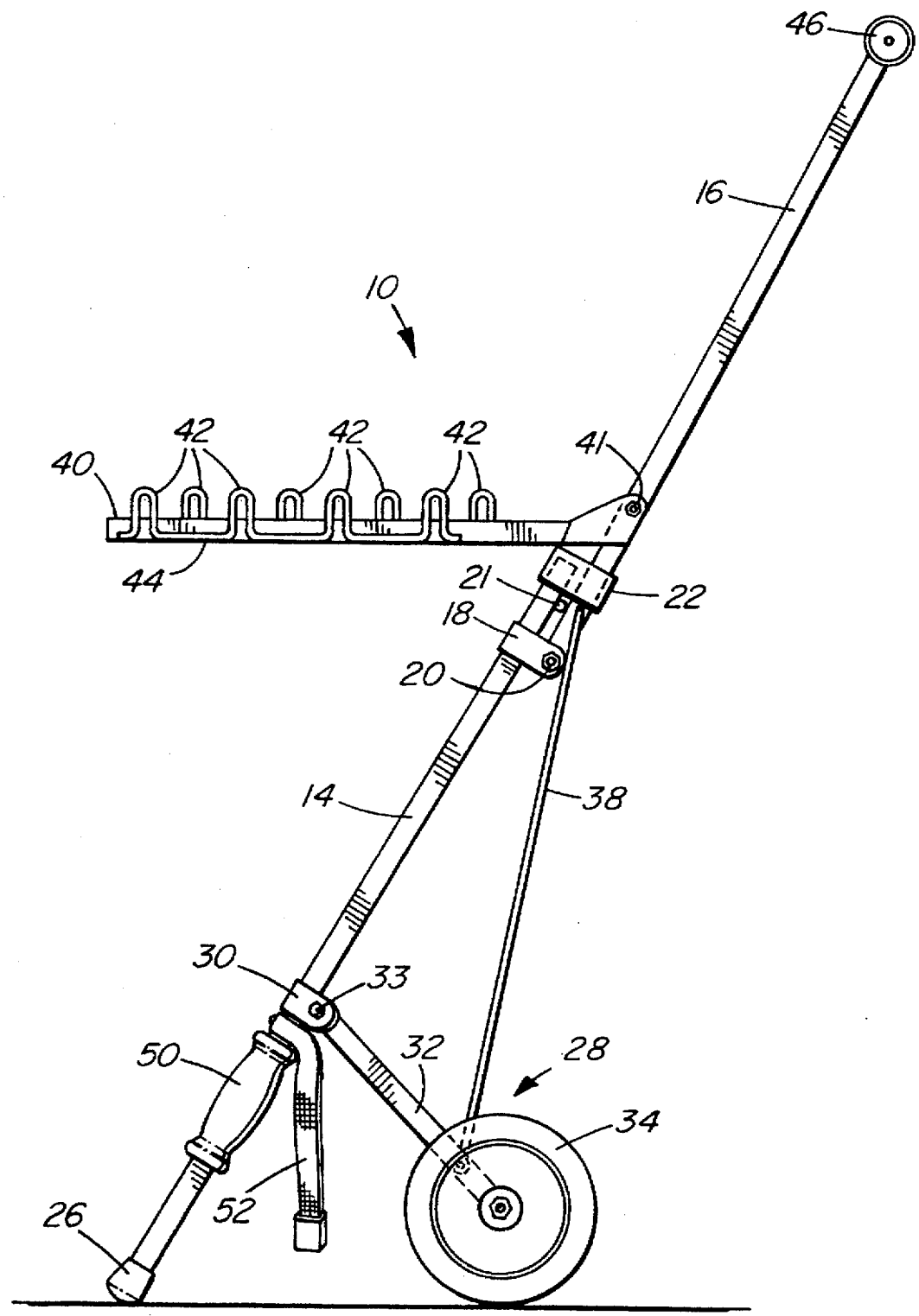
FIG. 2 is a side elevational view of the collapsible cart of FIG. 1.

As shown best in FIG. 2, cart 10 includes an elongated lower frame 14 and upper frame 16 which are pivotally coupled together. Lower and upper frames 14, 16, are preferably lengths of hollow metal tubing which are coupled together by means of a U-shaped bracket 18 secured near the upper end of lower frame 14. Upper frame 16 is secured to bracket 18 by means of a screw fastener 20 which serves as the pivot axis.

Figure 3:
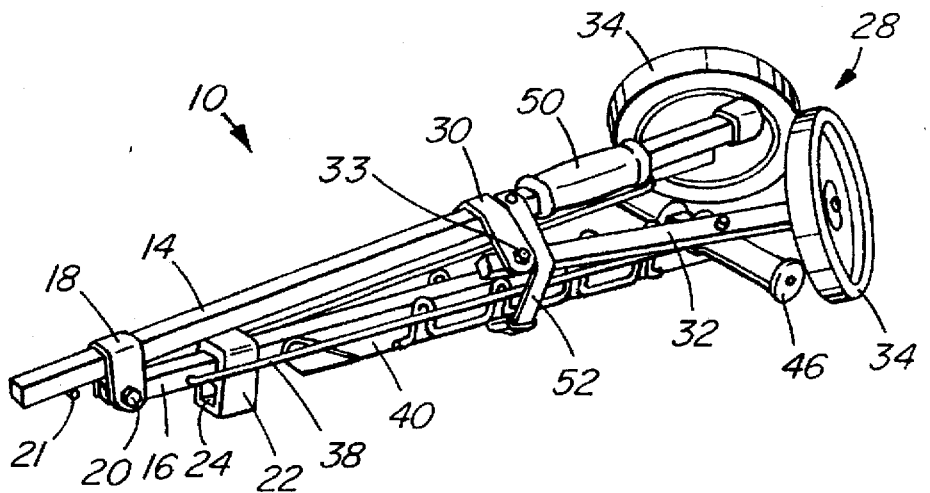
FIG. 3 is an isometric view of the cart in its fully collapsed configuration.
Figure 5:
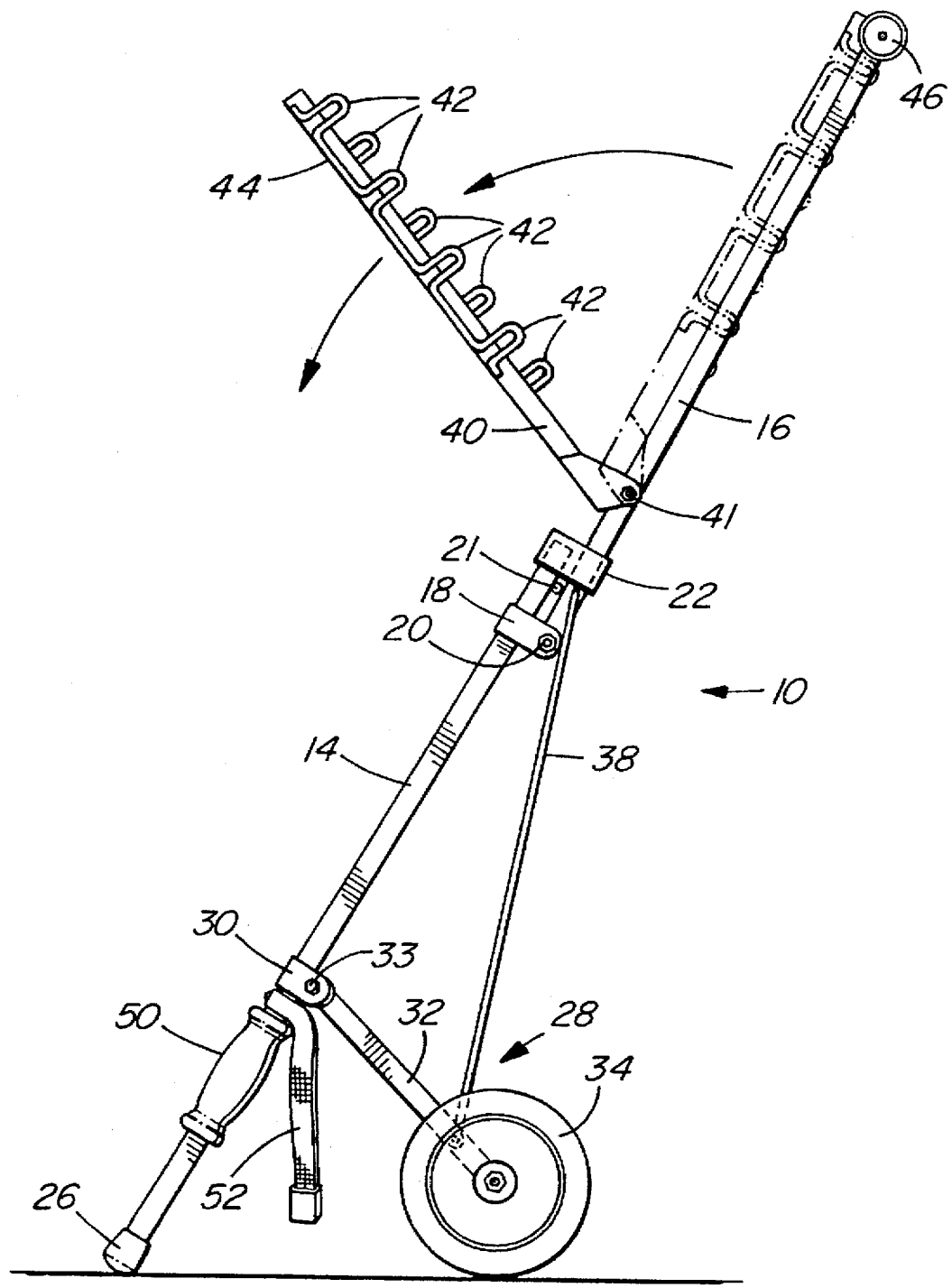
FIG. 5 is a side elevational view of the cart in a semi-deployed position showing the support arm being pivoted toward the load-supporting position.

A stop 21 is formed at the upper end of lower frame 14 adjacent bracket 18 as shown best in FIG. 3. Stop 21 contacts upper frame 16 when the frame is moved to the deployed position (FIGS. 1, 2 and 5).

Figure 4:
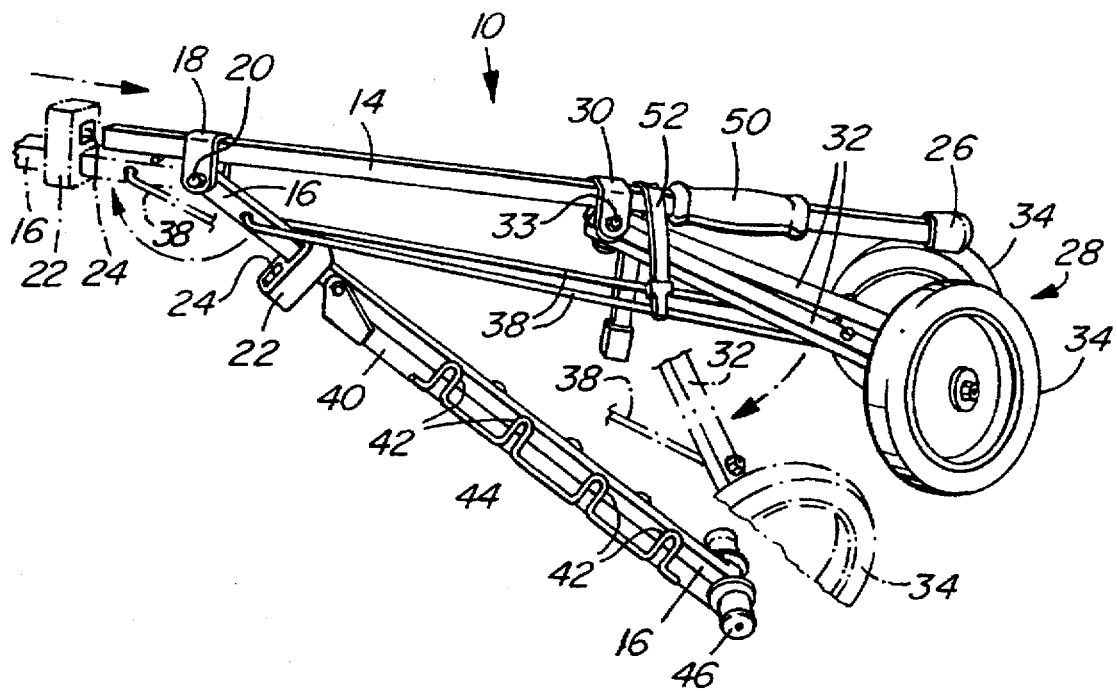
FIGS. 4 is a side elevational view of the cart showing the upper frame being pivoted relative to the lower frame toward the deployed position.

As shown best in FIGS. 2 and 4, a locking sleeve 22 is slidably coupled to the lower end of upper frame 16. Locking sleeve 22 includes a socket 24 for receiving the upper end of lower frame 14 in the deployed configuration (FIG. 4). Locking sleeve 22 thus restrains pivoting movement of upper frame 16 relative to lower frame 14 in the deployed configuration.

Cart 10 is supported on the ground by means of a stand 26 formed on the lowermost end of lower frame 14 and by means of a wheel assembly 28. Wheel assembly 28 includes a bracket 30 secured to lower frame 14 above stand 26 and a pair of wheel support legs 32 which diverge outwardly from lower frame 14. The upper ends of support legs 32 are pivotally coupled to bracket 30 by means of suitable screw fasteners 33. Ground-engaging wheels 34 are fitted on short axels (not shown) located at the lower end of support legs 32.

Wheel assembly 28 also includes a linkage 38 for coupling support legs 32 to a lower end of upper frame 16. Linkage 38 preferably comprises a U-shaped rod which extends through an aperture formed in upper frame 16 and which has threaded lower ends securable to support legs 32.

As shown best in FIGS. 1 and 2, cart 10 also includes a support arm 40 which is pivotally coupled to upper frame 16 by means of a fastener 41. Like lower and upper frames 14, 16, support arm 40 is preferably constructed from a length of hollow metal tubing. As discussed in further detail below, support arm 40 may be adjusted between a folded position extending alongside upper frame 16 and a horizontal, load-supporting position extending laterally from upper frame 16.

A plurality of spaced-apart hooks 42 are secured to side surfaces of support arm 40 for suspending grocery bags 12 and the like (FIG. 1). Hooks 42 are preferably loops formed on continuous hook rods 44 secured to the side surfaces of support arm 40. The hook rods 44 are mounted so that hooks 42 on opposite sides of support arm 40 are staggered for balanced load distribution.

A steering handle 46 having a pair of hand grips is provided at the uppermost end of upper frame 16 for steering cart 10 in the deployed position. A carrying handle 50 is preferably secured to lower frame 14 between ground-engaging stand 26 and wheel assembly bracket 30. Carrying handle 50 is provided for carrying cart 10 in the fully collapsed position (FIG. 3).

A strap 52 is also preferably secured to lower frame 14 for binding the various sections of cart 10 together in the fully collapsed position (FIG. 3).

FIGS. 4 and 5 illustrate the series of steps required to adjust cart 10 between the fully collapsed and the fully deployed, load-supporting positions. Strap 52 is first detached and upper frame 16 is pivoted relative to lower frame 14 about fastener 20 (FIG. 4). As upper frame is pivoted upwardly, linkage 38 extending between wheel support legs 32 and upper frame 16 causes wheels 34 to spread outwardly as support legs 32 pivot relative to bracket 30.

Upper frame is pivoted until it contacts stop 21 formed near the upper end of lower frame 14. Locking sleeve 22 is then slid downwardly until the upper end of lower frame 14 is securely seated within sleeve socket 24 (FIG. 4). In this deployed position lower and upper frames 14, 16 are in approximate longitudinal alignment.

As shown in FIG. 5, the final deployment step is to pivot support arm 40 downwardly to its load-supporting position extending laterally from upper frame 16.

As shown best in FIGS. 1 and 2, cart 10 is free-standing in the fully deployed, load-supporting position. Stand 26 and wheels 34 provide stable, three-point ground contact. Support arm 40 acts as a counter-balance (counterbalancing the weight of upper frame 16 and steering handle 46).

In use, the handles of grocery bags 12 are suspended from hooks 42 formed on support arm 40. In the embodiment illustrated in FIG. 1, support arm 40 has a maximum capacity of eight bags or roughly sixty-five pounds of load. Bags 12 are preferably suspended on alternating sides of support arm 40 for optimum stability while loading.

Once cart 10 is fully loaded, steering handle 46 is tipped forwardly which raises stand 26 above the ground surface. As cart 10 is tipped forwardly, the load suspended from support arm 40 is balanced directly above wheel assembly 28. This allows the user to push or pull cart 10 to the desired location with minimal effort. Unlike many prior art designs, very little of the load is transmitted to steering handle 46 during use. It is expected cart 10 will be primarily used to transport grocery bags 12 or the like from a retail outlet to the user's car or residence.

Once bags 12 are removed, cart 10 may be readily adjusted to the fully collapsed position shown in FIG. 3 by reversing the adjustment steps described above. Carrying grip 50 ensures that cart 10 may be easily carried in the fully collapsed position.

As should be apparent to someone skilled in the art, optional accessories could be coupled to cart 10 as required. For example, a dolly adaptor (not shown) could be removably coupled to the lower end of lower frame 14. Similarly, a holster bag or pannier could be coupled to support arm 40 for carrying brief cases, books, tools or the like.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A collapsible cart comprising:
   (a) an elongated frame having a first section and a second section pivotally coupled to said first section, said frame being adjustable between a deployed position wherein said second section extends above said first section for steering said cart, and a collapsed position wherein said first and second sections are folded alongside one another;
   (b) at least one wheel rotatably coupled to said first section;
   (c) a support arm pivotally coupled to said second section, wherein said support arm is adjustable between a load supporting position extending laterally from said frame and a folded position alongside said frame and extending parallel thereto; and
   (d) retention means on said support arm for retaining a load to be suspended.

2. The collapsible cart as defined in claim 1, wherein said first and second frame sections are substantially longitudinally aligned in said deployed position.

3. The collapsible cart of claim 1, further comprising locking means on said frame for restraining pivotal motion of said first and second sections in said deployed position.

4. The collapsible cart of claim 3, wherein said locking means comprises a sleeve slidably coupled to said second section, said sleeve comprising a socket for receiving an upper end of said first section in said deployed position.

5. The collapsible cart of claim 1, wherein said retention means comprises a plurality of spaced-apart hooks mounted on said support arm.

6. The collapsible cart of claim 5, wherein said hooks are formed on at least one continuous hook rod secured to a side surface of said support arm.

7. The collapsible cart of claim 1, further comprising a carrying handle on said first section for carrying said cart in said collapsed position.

8. The collapsible cart of claim 1, wherein a lower end of said frame first section comprises a ground-engaging stand for supporting said cart in said deployed position.

9. The collapsible cart of claim 8, further comprising a pair of wheels for supporting said cart in said deployed position and a pair of support legs pivotally coupling said wheels to said first section.

10. The collapsible cart of claim 9, further comprising linkage means extending between said each of said support legs and said second section for actuating pivoting movement of said support legs when said frame is moved between said collapsed and deployed positions.

11. The collapsible cart of claim 9, wherein said wheels and said support arm are disposed on opposite sides of said frame in said deployed position.

12. The collapsible cart of claim 2, wherein an upper end of said second section comprises a steering handle.

13. The collapsible cart of claim 2, wherein said support arm extends horizontally in said load-supporting position.

14. The collapsible cart of claim 13, wherein the longitudinal axis of said frame extends at an angle of approximately 30 degrees relative to a vertical axis in said deployed position.

15. The collapsible cart of claim 1, wherein said cart is free-standing when said frame is in said deployed position and said support arm is in said load-supporting position.

16. The collapsible cart of claim 15, wherein said support arm counterbalances the weight of said second section in said load-supporting position.

* * * * *